( 12 ) United States Patent
Sherbeck et al.

(10) Patent No.: US 7,926,848 B2
(45) Date of Patent: Apr. 19, 2011

(54) LIGHT WEIGHT BEAM AND TRUCK FRAME UTILIZING A LIGHT-WEIGHT BEAM

(75) Inventors: Timothy D. Sherbeck, Katy, TX (US); Paul D. Bentley, Utica, MI (US)

(73) Assignee: BAE Systems Tactical Vehicle Systems, LP, Sealy, TX (US)

( * ) Notice: Subject to any disclaimer, the term of this patent is extended or adjusted under 35 U.S.C. 154(b) by 89 days.

(21) Appl. No.: 12/422,779

(22) Filed: Apr. 13, 2009

(65) Prior Publication Data

US 2009/0256399 A1 Oct. 15, 2009

Related U.S. Application Data

(60) Provisional application No. 61/044,379, filed on Apr. 11, 2008.

(51) Int. Cl.
*B62D 21/02* (2006.01)
(52) U.S. Cl. ........ 280/800; 280/781; 280/785; 280/797; 296/204
(58) Field of Classification Search .................. 280/781, 280/785, 797, 800, 798; 296/204
See application file for complete search history.

(56) References Cited

U.S. PATENT DOCUMENTS

| | | | | |
|---|---|---|---|---|
| 875,254 A * | 12/1907 | Gartshore | ...................... | 280/800 |
| 1,848,895 A * | 3/1932 | MacPherson | ................... | 280/800 |
| 2,177,991 A * | 10/1939 | Maddock | ....................... | 280/794 |
| 2,838,322 A * | 6/1958 | Felts et al. | ..................... | 280/800 |
| 2,843,725 A * | 7/1958 | Granberg | ....................... | 219/105 |
| 3,088,749 A * | 5/1963 | Schilberg | ....................... | 280/792 |
| 3,129,954 A * | 4/1964 | Duero et al. | ................... | 280/792 |
| 3,264,010 A * | 8/1966 | Pierce | ............................ | 280/792 |
| 4,291,515 A * | 9/1981 | Harding | .......................... | 52/694 |
| 4,726,166 A * | 2/1988 | DeRees | ........................... | 52/694 |
| 4,732,819 A | 3/1988 | Komuro | | |
| 4,734,971 A * | 4/1988 | Dupasquier | ..................... | 29/417 |
| 4,798,400 A | 1/1989 | Kosuge | | |
| 4,804,199 A * | 2/1989 | Picard | ....................... | 280/33.998 |
| 5,149,132 A * | 9/1992 | Ruehl et al. | ................... | 280/800 |
| 5,209,541 A | 5/1993 | Janotik | | |
| 5,308,115 A * | 5/1994 | Ruehl et al. | ................... | 280/785 |
| 5,507,522 A | 4/1996 | Ritchie | | |
| 5,829,219 A * | 11/1998 | Sugawara et al. | ............ | 52/653.2 |
| 5,855,394 A * | 1/1999 | Horton et al. | ................. | 280/781 |
| 6,099,194 A * | 8/2000 | Durand | .......................... | 403/270 |
| 6,189,930 B1 * | 2/2001 | Kalazny | ........................ | 280/781 |
| 6,299,210 B1 * | 10/2001 | Ruehl et al. | ................... | 280/800 |

(Continued)

FOREIGN PATENT DOCUMENTS

EP 0 952 020 A2 10/1999

(Continued)

OTHER PUBLICATIONS

Webpages regarding Docol steel, www.ssab.com/en/Brands/DOCOL/Produkter1/DOCOL-Cold-Rolled/.

(Continued)

*Primary Examiner* — Paul N Dickson
*Assistant Examiner* — Nicole Verley
(74) *Attorney, Agent, or Firm* — Greenberg Traurig LLP; Ben D. Tobor

(57) ABSTRACT

A light weight beam, a truck frame utilizing a light weight beam, and a method of assembling a truck frame, each include a composite box beam.

31 Claims, 10 Drawing Sheets

U.S. PATENT DOCUMENTS

| | | |
|---|---|---|
| 6,412,818 B1 | 7/2002 | Marando |
| 6,733,040 B1 * | 5/2004 | Simboli ................. 280/800 |
| 6,805,379 B2 | 10/2004 | Nommensen |
| 7,350,818 B2 | 4/2008 | Rini et al. |
| 7,717,498 B2 * | 5/2010 | Fleming ................. 296/203.01 |
| 7,722,280 B2 * | 5/2010 | Hofmann ................. 403/266 |
| 7,793,981 B2 * | 9/2010 | Xie et al. ................. 280/785 |
| 7,819,463 B2 * | 10/2010 | Werner ................. 296/184.1 |
| 2003/0184075 A1 * | 10/2003 | Freeman et al. ................. 280/797 |
| 2007/0176406 A1 * | 8/2007 | Ruehl ................. 280/785 |
| 2007/0241587 A1 * | 10/2007 | Fleming ................. 296/203.01 |

FOREIGN PATENT DOCUMENTS

| | | |
|---|---|---|
| EP | 1 803 632 A1 | 7/2007 |
| GB | 1474696 | 5/1977 |
| WO | WO 2007/120273 A2 | 10/2007 |

OTHER PUBLICATIONS

U.S. Patent and Trademark Office information page regarding trademark Registration 3,405,211 for mark DOCOL.

* cited by examiner

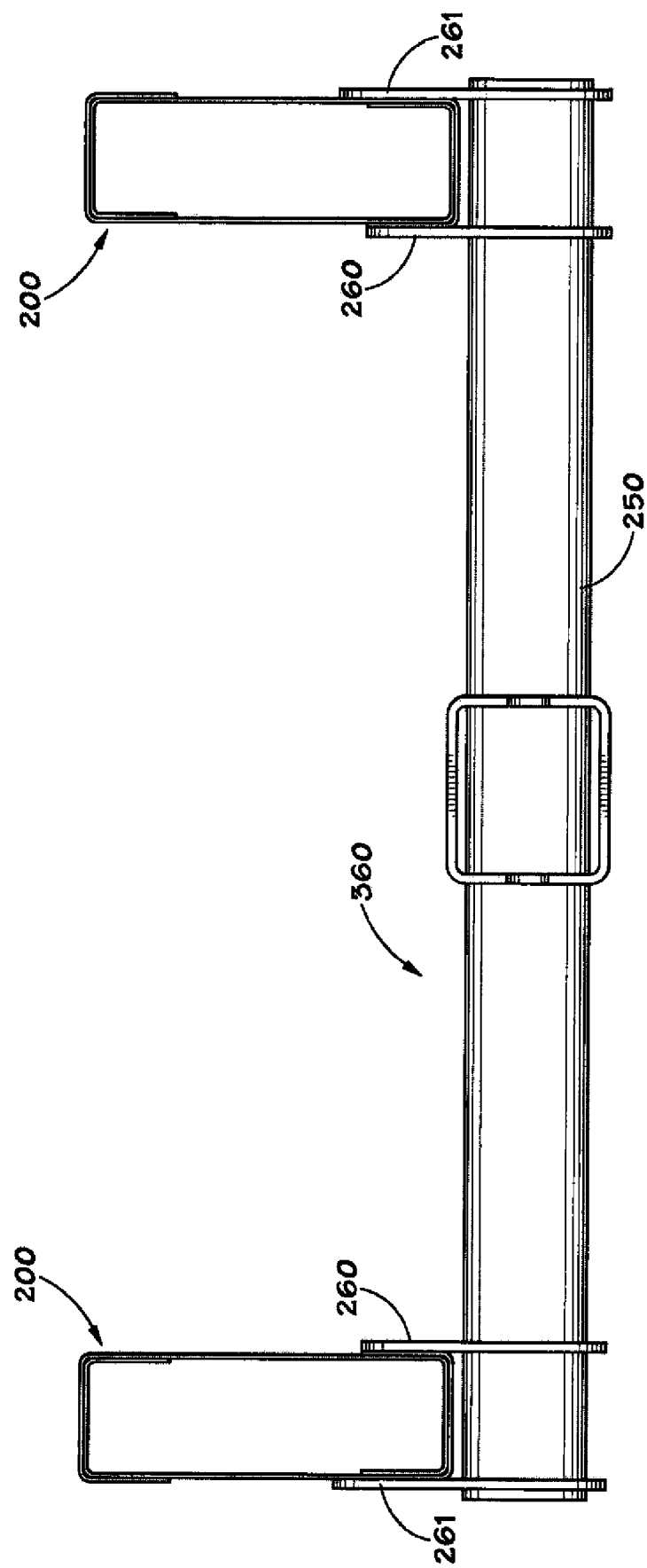

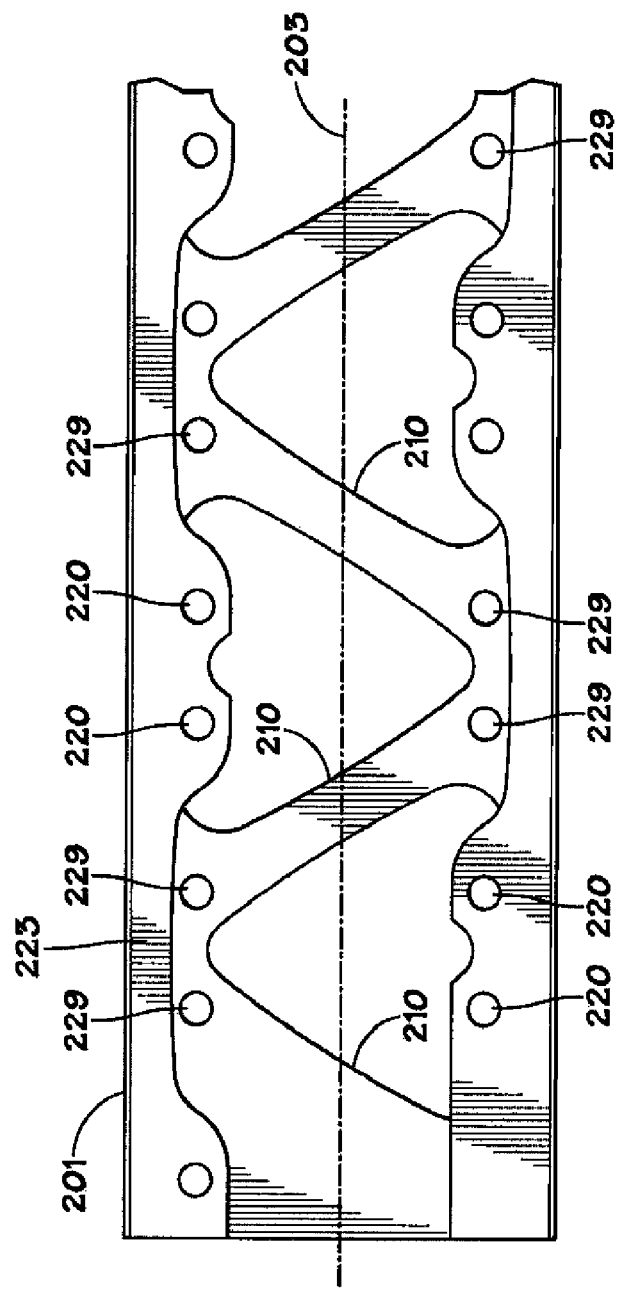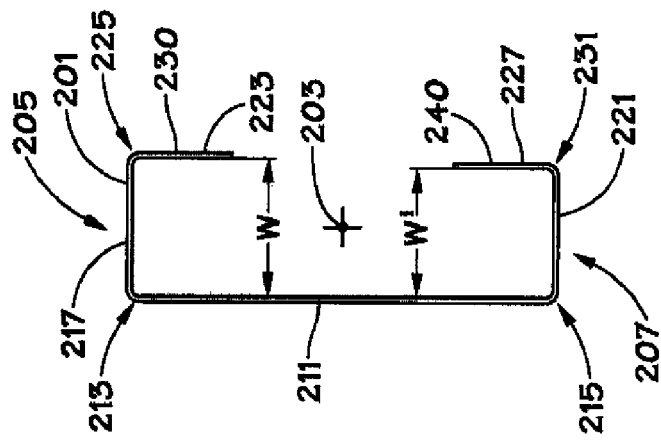

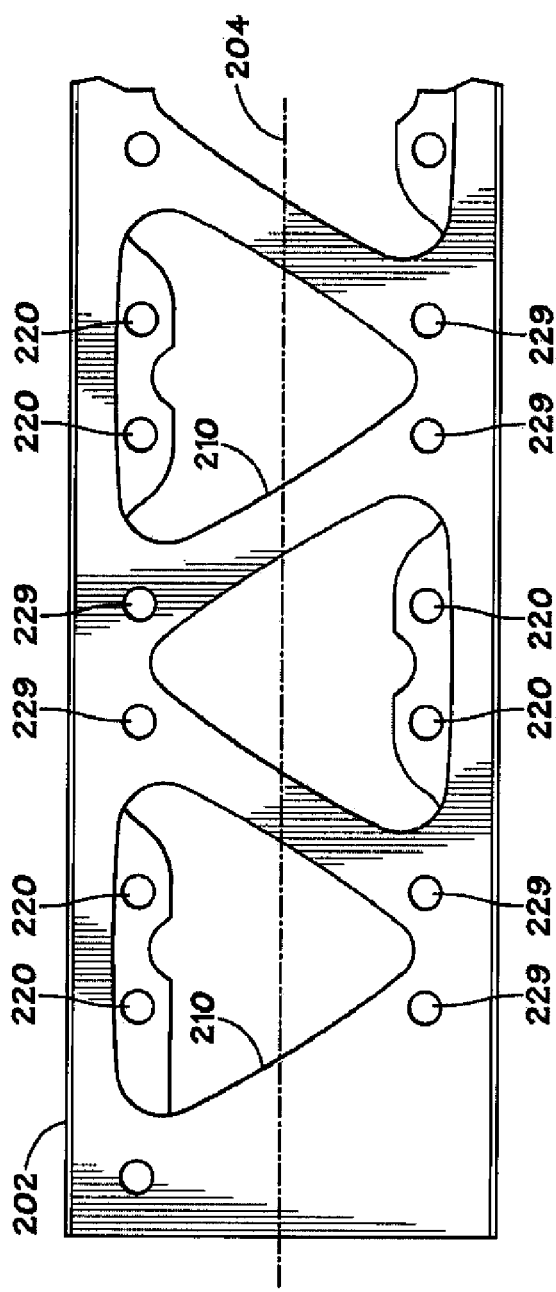
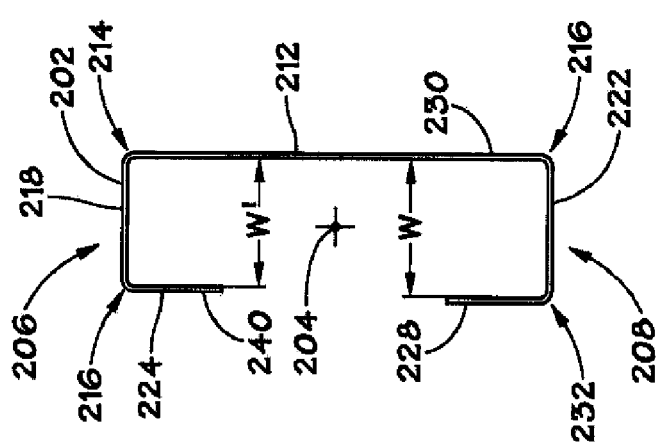

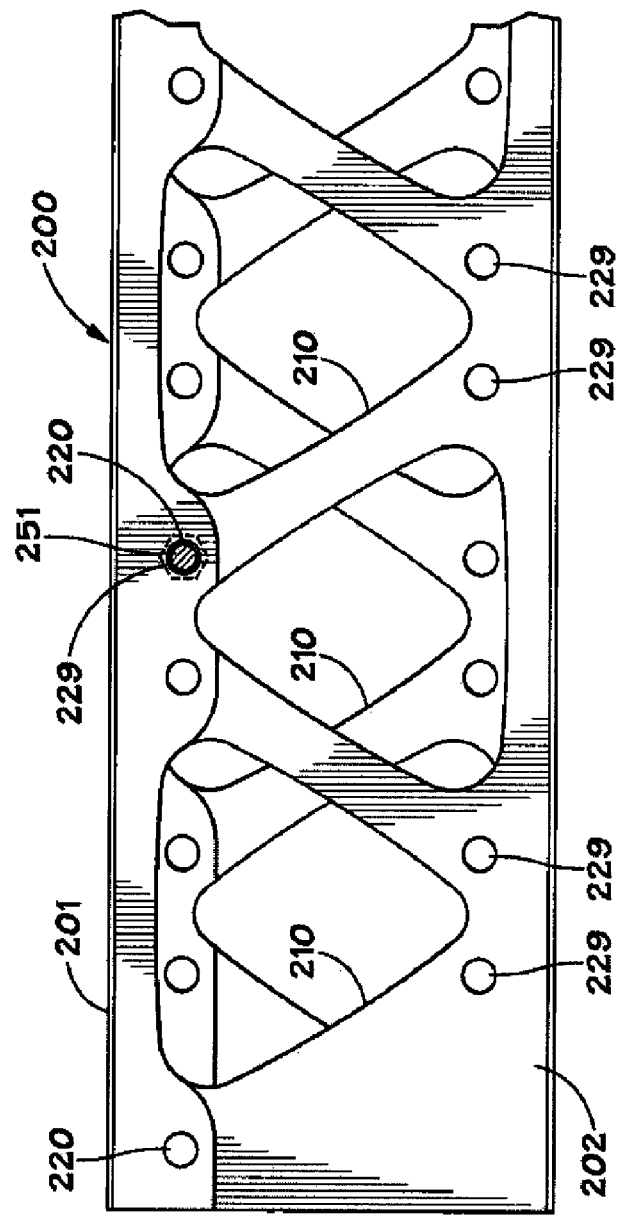
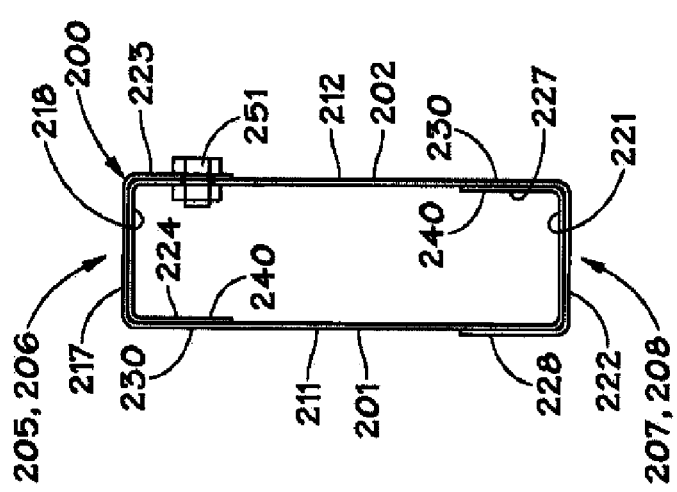

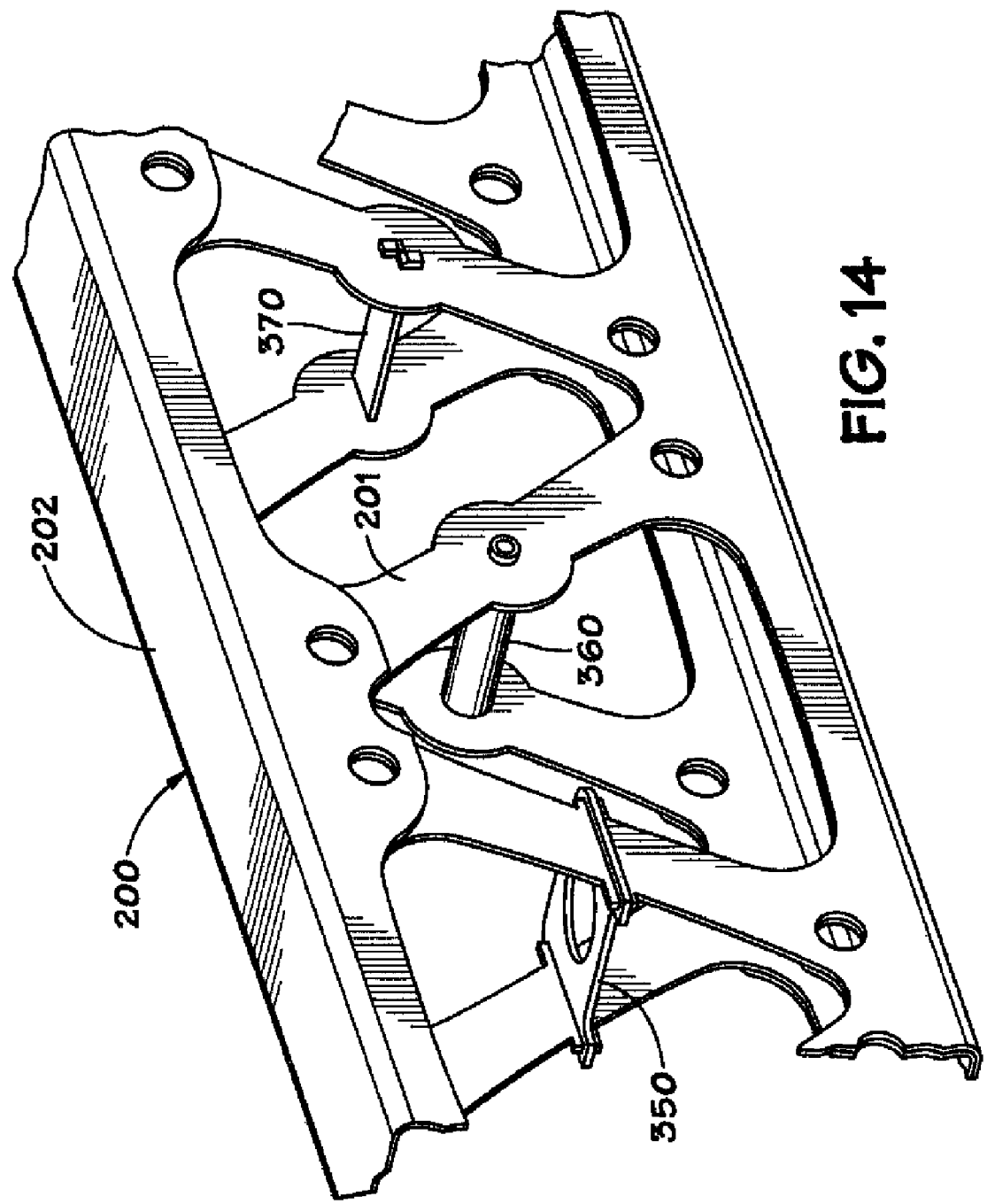

LIGHT WEIGHT BEAM AND TRUCK FRAME UTILIZING A LIGHT-WEIGHT BEAM

RELATED APPLICATION

This application claims the priority and benefit of U.S. patent application Ser. No. 61/044,379, filed Apr. 11, 2008, and entitled "Light Weight Beam and Truck Frame Utilizing Light Weight Beam".

BACKGROUND OF THE INVENTION

1. Field of the Invention

The invention relates to a light weight beam and to a truck frame utilizing the light weight beam.

2. Description of the Related Art

Various types of truck frames have previously been in use

SUMMARY OF THE INVENTION

Various illustrative embodiments of the present light weight beam and truck frame provide advantageous truck frames having low weight and high strength. In accordance with one aspect of an illustrative embodiment of the present light weight beam, the beam may include first and second channel members, each channel member having a longitudinal axis and a top and a bottom, and may include an intermediate web member having an upper end and a lower end. An upper flange member may be associated with the upper end of the intermediate web member, and a lower flange member may be associated with the lower end of the intermediate web member. Each of the upper and lower flange members may be disposed substantially parallel to each other and may extend outwardly from the intermediate web member, and the upper and lower flange members may be disposed substantially perpendicular to the intermediate web member. The upper flange member may have an upper side flange member associated with an outer edge of the upper flange member, and the lower flange member may have a lower side flange member associated with an outer edge of the lower flange member. Each of the upper and lower side flange members may be disposed substantially parallel to, and in a spaced relationship from the intermediate web member. Further, in accordance with this aspect of an illustrative embodiment, the top and bottom of each of the first and second channel members may have a width, and the width of the top of the first channel member may be greater than the width of the top of the second channel member. The width of the bottom of the first channel member may be less than the width of the bottom of the second channel member. Additionally, the first and second channel members may be associated with each other with the top of the second channel member being disposed within the top of the first channel member and the bottom of the first channel member may be disposed within the bottom of the second channel member.

In accordance with another illustrative embodiment of the present truck frame, first and second beams, as further described herein, may be connected by at least two cross members which connect the first and second beam together.

In accordance with another illustrative embodiment of a method for assembling a truck frame, first and second beams as described herein may be provided, at least two cross members may be disposed between the first and second beams; and the truck frame may be assembled by attaching at least two cross members to the first and second beams.

BRIEF DESCRIPTION OF THE DRAWING

The present light weight beam and truck frame may be understood by reference to the following description taken in conjunction with the accompanying drawing, in which:

FIG. 2 is a partial cross-sectional view of the truck frame of FIG. 1 taken along lines 2-2 of FIG. 1;

FIG. 3 is a front view of a portion of the present light weight beam;

FIG. 4 is an end view of the portion of the light weight beam of FIG. 3;

FIG. 5 is a front view of another portion of the present light weight beam;

FIG. 6 is an end view of the portion of the beam of FIG. 5;

FIG. 7 is a front view of the assembly of the beam portions of FIGS. 3-6;

FIG. 8 is an end view of the assembled beam of FIG. 7;

FIG. 14 is a perspective view of another embodiment of a light weight beam for use in the present truck frame.

Figure 1:
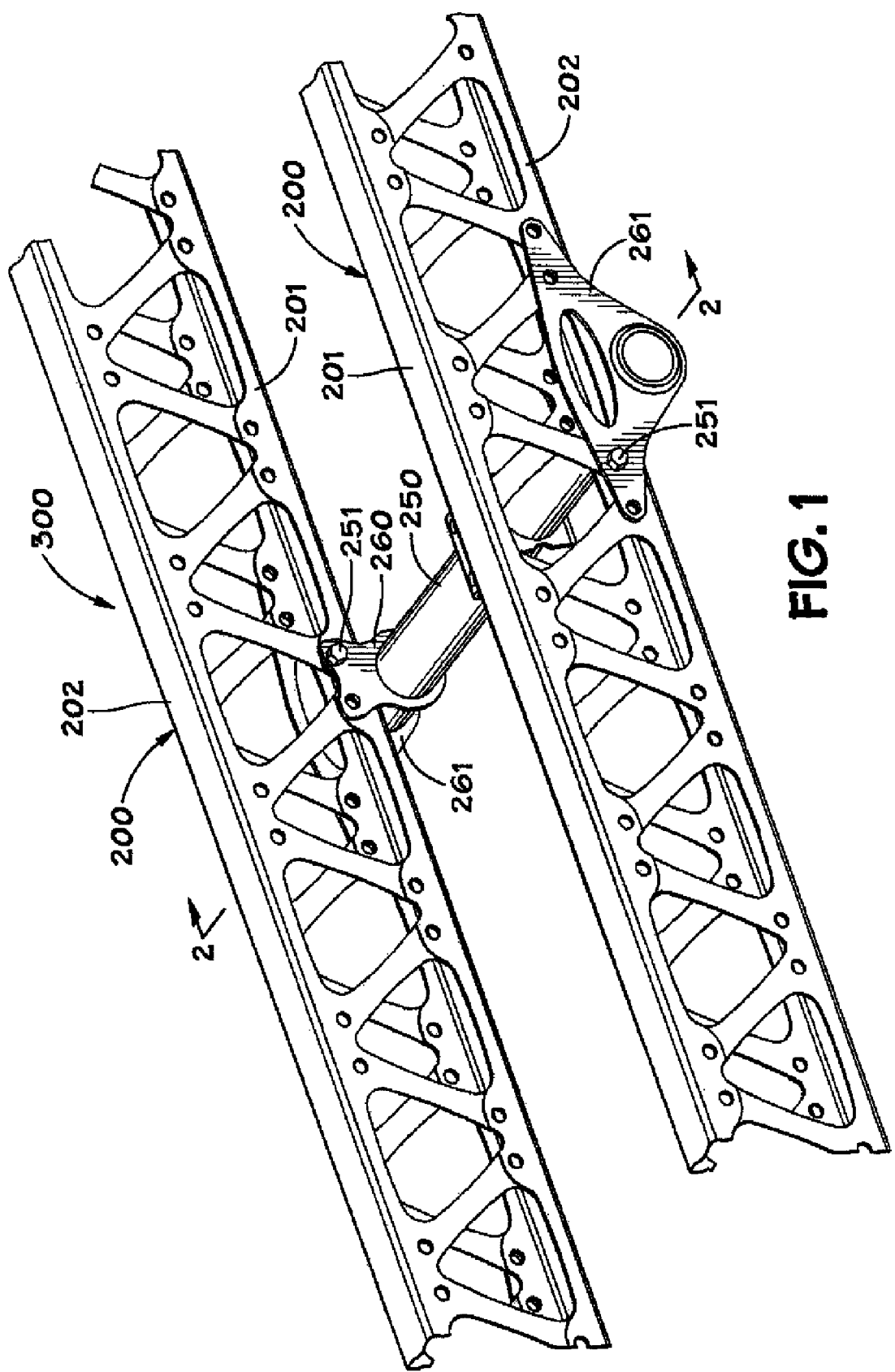
FIG. 1 is a perspective view of a portion of the present truck frame, which includes an embodiment of the present light weight beam.

While certain embodiments of the present light weight beam and truck frame will be described in connection with the preferred illustrative embodiments shown herein, it will be understood that it is not intended to limit the invention to those illustrative embodiments. On the contrary, it is intended to cover all alternatives, modifications, and equivalents, as may be included within the spirit and scope of the invention as defined by the appended claims.

DETAILED DESCRIPTION OF THE ILLUSTRATIVE EMBODIMENTS

With reference to FIGS. 1, 2, and 7-9, and illustrative embodiment of a light weight beam 200 is illustrated. Light weight beam 200 is preferably formed by assembling two beam components, or halves, 201, 202, as shown in FIGS. 3-6, to form a beam, or box beam, 200. Each of the beam halves 201, 202 preferably includes a plurality of cutouts, or openings, 210 which reduce the weight of each of the beam halves 201, 202, and in turn reduce the weight of the overall box beam 200. Preferably, another plurality of openings 220, preferably having a round configuration, permit receipt of suitable fasteners (not shown for drawing clarity), such as bolts, rivets, or other fasteners, so that the two beam halves, 201, 202, may be assembled to form a composite box beam 200. Openings 220 could have other configurations, if desired, such as oval, triangular shaped or any configuration which permits the desired passage and receipt therethrough of the desired fastener. Similarly, the cross-sectional shape of the bolts, rivets, or other fasteners could be any shape that may be passed through and received within the openings 220. Each beam half 201, 202, has an outer half 230 and an inner half 240, whereby the beam halves 201, 202 may be assembled, by inserting the inner beam halves 240 within the outer beam halves 230 to form a composite box beam 200 as illustrated in FIGS. 7 and 8.

The composite box beam 200 may be, and is preferably, produced without welds or any welding, for maximum durability under high stress and cyclic load conditions. Each of beam halves 201, 202 may be formed as channel members, such as a C-shaped channel member, although other channel shapes could be utilized. The inner halves and outer halves 240, 230 may be identical components, or may be different to accommodate differing design requirements, as desired. The shapes of the opening 210 while preferably illustrated as generally triangular shaped openings 210, could have any other desired shapes.

Beam 200 could be made of steel, aluminum, or any other suitable plastic, or metallic material, which provides the requisite desired strength characteristics for the intended use of the beam 200. Preferably, for a truck frame, beam 200 is made from a high strength or ultra-high strength steel such as those sold by SSAB Swedish Steel Inc., sold under the trademarks DOMEX® and DOCOL®. The wall thickness of the beam halves 201, 202 are within a range of 1 to 5 mm., and preferably 2-3 mm. Thus, when the beam halves are connected, or assembled together, the composite wall thickness of beam 200 is within a range of from 2-10 mm., and preferably 4-6 mm. in thickness.

With reference to FIGS. 3-8, an illustrative embodiment of beam 200 will be described in greater detail. Beam 200 may be assembled from beam halves, or first and second channel members 201, 202, and each channel member 201, 202, may have a longitudinal axis 203, 204 and a top 205, 206, and a bottom 207, 208. Each channel member 201, 202, includes an intermediate web member 211, 212 having an upper end 213, 214, and a lower end 215, 216. An upper flange member 217, 218 is associated, or connected, with the upper end 213, 214 of each intermediate web member 211, 212, and a lower flange member 221, 222 is associated, or connected, with the lower end 215, 216 of the intermediate web members 211, 212. Preferably, the upper flange members 217, 218, and the lower flange members 221, 222, are formed integrally with the intermediate web members 211, 212. Each of the upper and lower flange members 217, 218, 221, 222, are disposed substantially parallel to each other and extend outwardly from the intermediate web members 211, 212. As seen in FIGS. 4 and 6, the upper and lower flange members 217, 218, 221, 222 are preferably disposed substantially perpendicular to the intermediate web members 211, 212.

Still with reference to FIGS. 3-8, the upper flange members 217, 218 preferably each have an upper side flange member 223, 224 associated with an outer edge 225, 226 of the upper flange members 217, 218. Similarly, the lower flange members 221, 222 each have a lower side flange member 227, 228 associated with, or connected to, an outer edge 231, 232 of the lower flange members 221, 222. Each of the upper and lower side flange members 223, 224, 227, 228 are preferably disposed substantially parallel to, and in a spaced relationship from the intermediate web members 211, 212. The top 205, 206 and bottom 207, 208 of each of the first and second channel members 201, 202, have a width W or W' and the width W of the top 205 of the first channel member 201 is greater than the width W' of the top 206 of the second channel member 202. Similarly, the width W' of the bottom 207 of the first channel member 201 is less than the width W of the bottom 208 of the second channel member 202. If desired, rather than beam 200 having a substantially rectangular cross-sectional configuration as shown in FIG. 8, the beam could have a substantially trapezoidal cross-sectional configuration or alternatively, one or both of the intermediate web members could have an offset to enable the widths to be different.

Still with reference to FIGS. 3-8, and in particular with respect to FIGS. 7 and 8, the first and second channel members 201, 202 are associated with each other with the top 206 of the second channel member 202 being disposed within the top 205 of the first channel member 201, and the bottom 207 of the first channel member 201 is disposed within the bottom 208 of the second channel member 202. In this manner, the first and second channel members 201, 202 are associated with each other to form box beam 200 having a generally rectangular shape cross-sectional configuration is shown in FIG. 8. The upper side flange member 224 of the second channel member 202 is preferably disposed adjacent the intermediate web member 211 of the first channel member 201, and the lower side flange member 27 of the first channel member 201 is disposed adjacent the intermediate web member 212 of the second channel member. The upper flange member 218 of the second channel member 202 is preferably disposed adjacent to the upper flange member 217 of the first channel member 201 within the top 205 of the first channel member 201. The lower flange member 221 of the first channel member 201 is preferably disposed adjacent to the lower flange member 222 of the second channel member 202 and within the bottom 208 of the second channel member 202, as seen in particular with reference to FIG. 8.

Still with reference to FIGS. 3-8, the plurality of openings 210, previously described, are disposed in the intermediate web member of at least one channel member, and preferably openings 210 are disposed in both of the intermediate web members 211, 212. As previously described, the plurality of openings 210 may have a generally triangular shaped configuration, or any other desired configuration. Another plurality of openings 220 are disposed in the upper side flange members 223, 224 and in the lower side flange members 227, 228 of the first and second channel members 201, 202. Another plurality of openings 229 are disposed in the intermediate web members 211, 212 of the first and second channel members 201, 202. When box beam 200 is assembled as shown in FIGS. 7 and 8, at least some of the openings 220 in the upper side and lower side flange member 223, 224, 227, 228 will overlie and mate with, at least some of the openings 229 disposed in the intermediate web members 211, 212, whereby a plurality of fasteners, one of which is illustrated at 251 in FIG. 7, as previously described, may be passed through the mating openings 229, 220, for associating, attaching, securing, or otherwise connecting the first and second channel members 201, 202 with each other to form box beam 200. As seen in FIGS. 1 and 2, the same mating opening 229, 220 may be utilized to receive fasteners 251 to attach mounting plates, or cross-member mounting plates 260, 261, to beams 200, as will be hereinafter described. Openings 220, 229 may also be utilized to join, attach, associate or otherwise secure truck components to the beam 200, as will be hereinafter described.

Figure 9:
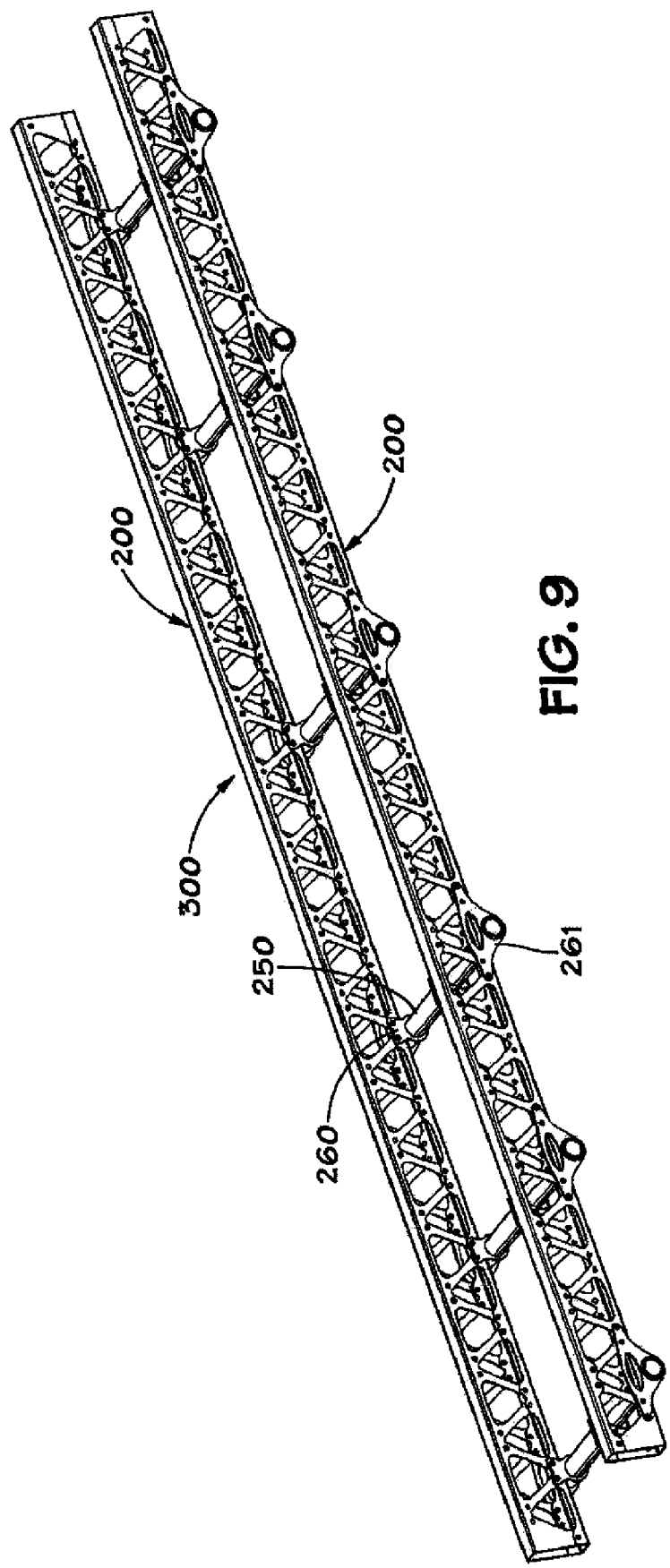
FIG. 9 is a perspective view of an embodiment of a truck frame utilizing the assembled beam of FIGS. 7 and 8.

In another illustrative embodiment, round cross members 250 (FIGS. 1, 2, and 9) may be utilized to join two beams 200, as previously described, to form a truck frame, or truck frame structure, 300. Of course, other cross-sectional configurations, such as oval, square, rectangular, etc. shapes could be used for cross members 250. Suitable mounting plates, or crossmember plates, 260, 261 may receive cross members 250, as shown in FIGS. 1 and 9. As seen in FIG. 1, the crossmember plates 260, 261 engage both sides, or beam halves, 201, 202, of beam 200.

Figure 11:
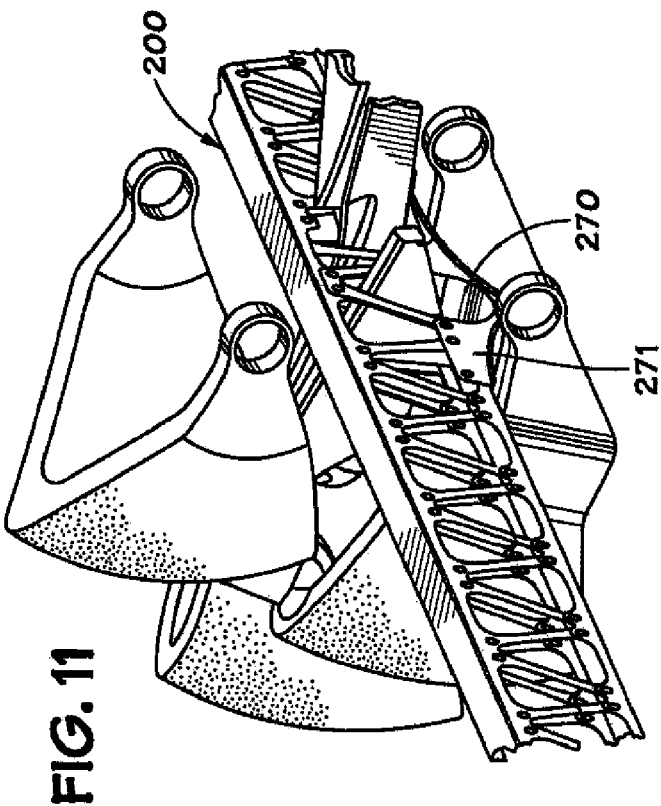
FIG. 11 is a perspective view of another embodiment of a light weight beam for use in the present truck frame.
Figure 10:
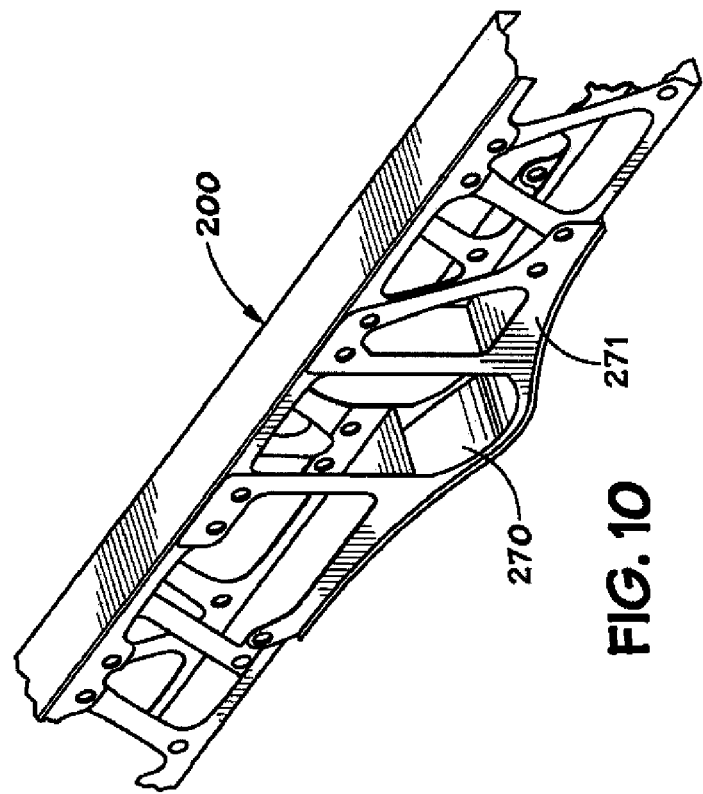
FIG. 10 is a perspective view of another embodiment of a light weight beam for use in the present truck frame.

With reference to FIGS. 10 and 11, a portion of one of the beam halves 201, 202, may be removed, or cutout, as at 270 and a reinforcement bridge, or plate member, 271 may be utilized. The cutout portion 270 may be required for halfshaft sweep envelope clearance, or steering arm sweep envelope clearance.

Figure 12:
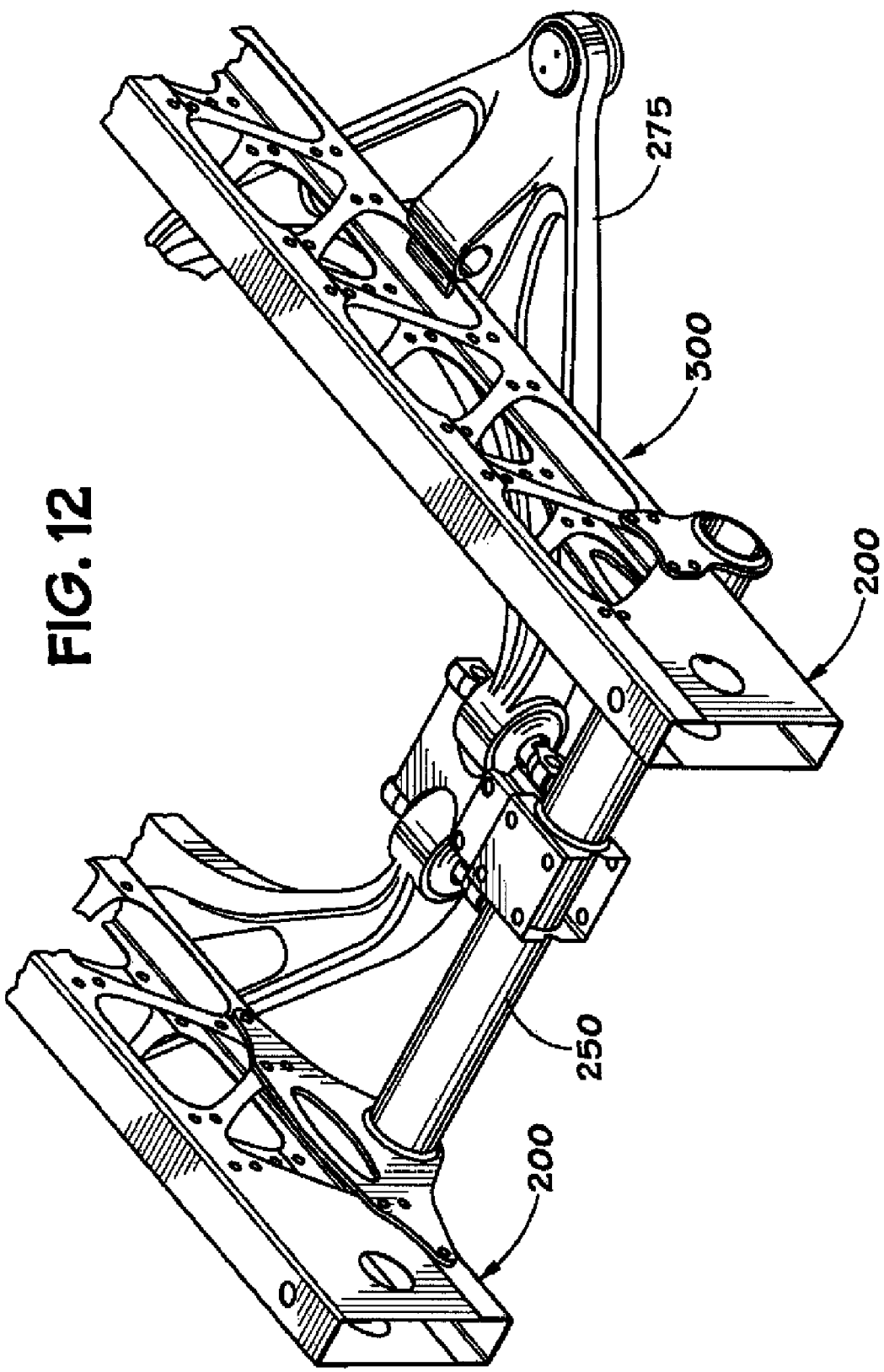
FIG. 12 is a partial, perspective view of a portion of the present truck frame.

FIG. 12 illustrates the joining of other truck components, such as a lower control arm assembly, 275 to the truck frame 300.

Figure 13:
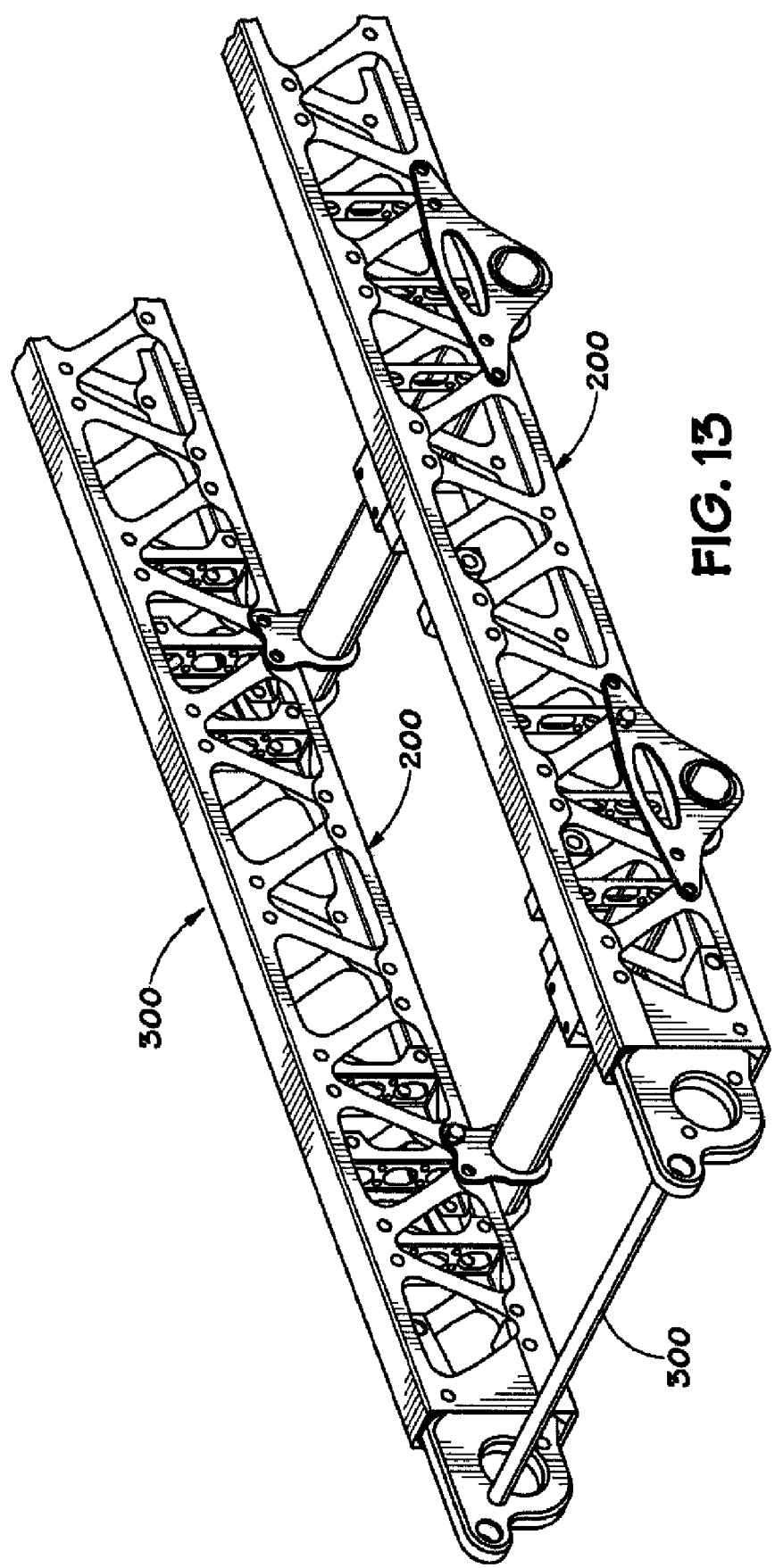
FIG. 13 is a partial, perspective view of another embodiment of a truck frame having a front tie-down.

FIG. 13 illustrates a truck frame 300 which includes a front tie-down 310.

FIG. 14 illustrates a box beam, or composite beam 200, being provided with three examples of truss elements 350, 360, 370 connecting beam halves 201, 202, to provide further reinforcement to beam 200, as well as to assist in preventing buckling of beam 200.

Although beams 200 are illustrated being used to form a truck frame 300, beams 200 could be used to form other structures wherein low weight and high strength are desired.

In another embodiment, a method for assembling a truck frame may include the steps of providing first and second beams 200 as previously described, disposing at least two cross members 250 between the first and second beams 200, and then attaching the at least two cross members 250 to the first and second beams 200, as by use of fasteners 251 and openings 220 229, as previously described.

While certain embodiments of the present light weight beam and truck frame have been described and illustrated in connection with various preferred illustrative embodiments, it will be understood to those skilled in the art that changes and modifications may be made without departing from the spirit and scope of the invention as defined by the appended claims.

We claim:

1. A beam comprising: first and second channel members, each channel member having a longitudinal axis and a top and a bottom, and including an intermediate web member having an upper end and a lower end, an upper flange member associated with the upper end of the intermediate web member, a lower flange member associated with the lower end of the intermediate web member, each of the upper and lower flange members disposed substantially parallel to each other and extending outwardly from the intermediate web member, the upper and lower flange members being disposed substantially perpendicular to the intermediate web member, the upper flange member having an upper side flange member associated with an outer edge of the upper flange member, the lower flange member having a lower side flange member associated with an outer edge of the lower flange member, each of the upper and lower side flange members being disposed substantially parallel to, and in a spaced relationship from the intermediate web member;

the top and bottom of each of the first and second channel members having a width, the width of the top of the first channel member being greater than the width of the top of the second channel member, and the width of the bottom of the first channel member being less than the width of the bottom of the second channel member;

the first and second channel members being associated with each other with the top of the second channel member being disposed within the top of the first channel member, and the bottom of the first channel member being disposed within the bottom of the second channel member.

2. The beam of claim 1, wherein the upper side flange member of the second channel member is disposed adjacent the intermediate web member of the first channel member, and the lower side flange member of the first channel member is disposed adjacent the intermediate web member of the second channel member.

3. The beam of claim 1, wherein the upper flange member of the second channel member is disposed adjacent to the upper flange member of the first channel member and within the top of the first channel member; and the lower flange member of the first channel member is disposed adjacent to the lower flange member of the second channel member and within the bottom of the second channel member.

4. The beam of claim 1, wherein a plurality of openings are disposed in the intermediate web member of at least one channel member.

5. The beam of claim 4, wherein at least one of the plurality of openings have a generally triangular shaped configuration.

6. The beam of claim 1, wherein a plurality of openings are disposed in the upper side and lower side flange members of the first and second channel members and a plurality of openings are disposed in the intermediate web members of the first and second channel members, and the openings are adapted to receive fasteners for associating the first and second channel members with each other.

7. The beam of claim 1, wherein a plurality of openings are disposed in the upper side and lower side flange members of the first and second channel members and a plurality of openings are disposed in the intermediate web members of the first and second channel members, and the openings are adapted to receive fasteners for connecting a truck component to the beam.

8. The beam of claim 1, wherein the first and second channel members are formed of a high strength or ultra high strength steel.

9. The beam of claim 1, wherein the intermediate web member, upper and lower flange members and upper and lower side flange members of each of the first and second channel members are formed integral with each other.

10. The beam of claim 9, wherein each of intermediate web members, upper and lower flange members and upper and lower side flange members of the first and second channel members have a wall thickness and the wall thickness falls within a range of from 1 to 5 mm.

11. A truck frame comprising:

a first beam and a second beam;

each of the first and second beams including first and second channel members, each channel member having a longitudinal axis and a top and a bottom, and including an intermediate web member having an upper end and a lower end, an upper flange member associated with the upper end of the intermediate web member, a lower flange member associated with the lower end of the intermediate web member, each of the upper and lower flange members disposed substantially parallel to each other and extending outwardly from the intermediate web member, the upper and lower flange members being disposed substantially perpendicular to the intermediate web member, the upper flange member having an upper side flange member associated with an outer edge of the upper flange member, the lower flange member having a lower side flange member associated with an outer edge of the lower flange member, each of the upper and lower side flange members being disposed substantially parallel to, and in a spaced relationship from the intermediate web member;

the top and bottom of each of the first and second channel members having a width, the width of the top of the first channel member being greater than the width of the top of the second channel member, and the width of the bottom of the first channel member being less than the width of the bottom of the second channel member;

the first and second channel members being associated with each other with the top of the second channel member being disposed within the top of the first channel member, and the bottom of the first channel member being disposed within the bottom of the second channel member; and at least two cross members connecting the first and second beams together.

12. The truck frame of claim 11, wherein the upper side flange member of the second channel member is disposed adjacent the intermediate web member of the first channel member, and the lower side flange member of the first channel member is disposed adjacent the intermediate web member of the second channel member.

13. The truck frame of claim 11, wherein the upper flange member of the second channel member is disposed adjacent to the upper flange member of the first channel member and within the top of the first channel member; and the lower flange member of the first channel member is disposed adjacent to the lower flange member of the second channel member and within the bottom of the second channel member.

14. The truck frame of claim 11, wherein a plurality of openings are disposed in the intermediate web member of at least one channel member.

15. The truck frame of claim 14, wherein at least one of the plurality of openings have a generally triangular shaped configuration.

16. The truck frame of claim 11, wherein a plurality of openings are disposed in the upper side and lower side flange members of the first and second channel members and a plurality of openings are disposed in the intermediate web members of the first and second channel members, and the openings are adapted to receive fasteners for associating the first and second channel members of each beam with each other.

17. The truck frame of claim 11, wherein a plurality of openings are disposed in the upper side and lower side flange members of the first and second channel members and a plurality of openings are disposed in the intermediate web members of the first and second channel members, and the openings are adapted to receive fasteners for connecting at least one truck component to a beam.

18. The truck frame of claim 11, wherein the first and second channel members are formed of a high strength or ultra high strength steel.

19. The truck frame of claim 11, wherein the intermediate web member, upper and lower flange members and upper and lower side flange members of each of the first and second channel members are formed integral with each other.

20. The truck frame of claim 19, wherein each of intermediate web members, upper and lower flange members and upper and lower side flange members of the first and second channel members have a wall thickness and the wall thickness falls within a range of from 1 to 5 mm.

21. The truck frame of claim 1, including a tie down member associated with the first and second beams.

22. A method for assembling a truck frame comprising:

providing a first beam and a second beam, each beam including first and second channel members, each channel member having a longitudinal axis and a top and a bottom, and including an intermediate web member having an upper end and a lower end, an upper flange member associated with the upper end of the intermediate web member, a lower flange member associated with the lower end of the intermediate web member, each of the upper and lower flange members disposed substantially parallel to each other and extending outwardly from the intermediate web member, the upper and lower flange members being disposed substantially perpendicular to the intermediate web member, the upper flange member having an upper side flange member associated with an outer edge of the upper flange member, the lower flange member having a lower side flange member associated with an outer edge of the lower flange member, each of the upper and lower side flange members being disposed substantially parallel to, and in a spaced relationship from the intermediate web member, the top and bottom of each of the first and second channel members having a width, the width of the top of the first channel member being greater than the width of the top of the second channel member, and the width of the bottom of the first channel member being less than the width of the bottom of the second channel member, the first and second channel members being associated with each other with the top of the second channel member being disposed within the top of the first channel member, and the bottom of the first channel member being disposed within the bottom of the second channel member;

disposing at least two cross members between the first and second beams; and attaching the at least two cross members to the first and second beams.

23. The method of claim 22, including disposing the upper side flange member of the second channel member adjacent the intermediate web member of the first channel member, and disposing the lower side flange member of the first channel member adjacent the intermediate web member of the second channel member.

24. The method of claim 22, including disposing the upper flange member of the second channel member adjacent to the upper flange member of the first channel member and within the top of the first channel member; and disposing the lower flange member of the first channel member adjacent to the lower flange member of the second channel member and within the bottom of the second channel member.

25. The method of claim 22, including disposing a plurality of openings in the intermediate web member of at least one channel member.

26. The method of claim 25, including providing at least one of the plurality of openings with a generally triangular shaped configuration.

27. The method of claim 22, including disposing a plurality of openings in the upper side and lower side flange members of the first and second channel members; disposing a plurality of openings in the intermediate web members of the first and second channel members, and inserting fasteners through the openings to associate the first and second channel members with each other.

28. The method of claim 22, including disposing a plurality of openings in the upper side and lower side flange members of the first and second channel members; disposing a plurality of openings are disposed in the intermediate web members of the first and second channel members, and inserting fasteners through the openings to connect a truck component to the beam.

29. The method of claim 22, including forming the first and second channel members of a high strength or ultra high strength steel.

30. The method of claim 22, including forming the intermediate web member, upper and lower flange members and upper and lower side flange members of each of the first and second channel members integral with each other.

31. The method of claim 30, including providing each of intermediate web members, upper and lower flange members and upper and lower side flange members of the first and second channel members with a wall thickness that falls within a range of from 1 to 5 mm.

* * * * *